United States Patent [19]
Fraga

[11] Patent Number: 5,586,489
[45] Date of Patent: Dec. 24, 1996

[54] METHOD AND APPARATUS FOR THE PREPARATION OF FOWL

[76] Inventor: Robert L. Fraga, 886 Cardoza, Tulare, Calif. 93274

[21] Appl. No.: 539,309

[22] Filed: Oct. 4, 1995

[51] Int. Cl.⁶ .............................. A47J 37/04; A22C 7/00
[52] U.S. Cl. ............................ 99/419; 99/421 H; 99/427; 99/442
[58] Field of Search .................. 99/419, 421 H, 99/421 A, 421 TP, 427, 382, 442, 483, 343, 342; 219/523, 227, 530, 533, 540, 396, 407, 521, 385; 165/104.21, 185; 426/391, 497, 466, 523; 392/451, 459

[56] References Cited

U.S. PATENT DOCUMENTS

| | | | |
|---|---|---|---|
| 1,802,532 | 4/1931 | Pulver | 426/391 |
| 1,979,501 | 11/1934 | Stepkin | 219/396 |
| 2,648,275 | 8/1953 | Thompson | 99/419 |
| 2,918,561 | 12/1959 | Perez | 219/523 |
| 3,377,943 | 4/1968 | Martin | 99/419 |
| 3,635,146 | 1/1972 | Aubert | 99/339 |
| 3,709,141 | 1/1973 | Schwartzstein | 99/343 |
| 3,899,657 | 8/1975 | Johnson | 219/523 |
| 3,965,808 | 6/1976 | Chomette | 99/419 |
| 3,980,010 | 9/1976 | Collinucci | 99/421 H |
| 4,715,273 | 12/1987 | Riesselmann | 99/442 |
| 4,810,856 | 3/1989 | Jovanovic | 99/419 X |
| 5,301,602 | 4/1994 | Ryczek | 99/345 |

*Primary Examiner*—Timothy F. Simone
*Attorney, Agent, or Firm*—Dennis B. Haase

[57] ABSTRACT

Apparatus or device for the preparation of fowl which has been dressed, comprising a heat transfer member having an exterior configuration which substantially conforms to the interior cavity of the dressed fowl and which, when inserted into the cavity, makes substantially total contact with the interior wall such that when the heat transfer member, with fowl mounted thereon, is placed in a heated environment, the fowl is initially seared in the interior cavity and thereafter cooked for human consumption in accordance with the method prescribed herein.

13 Claims, 2 Drawing Sheets

5,586,489

METHOD AND APPARATUS FOR THE PREPARATION OF FOWL

The present invention relates primarily, although not exclusively, to the commercial preparation of fowl, and more specifically to apparatus which permits a fully dressed bird to be rapidly and thoroughly cooked in a manner that enhances both flavor and appearance to the consumer, at a lower than expected cost.

BACKGROUND OF THE INVENTION

1. Field of the Invention

Since at least the mid to late '50s, America, indeed the world, has been fascinated with the concept of fast, when it comes to the preparation of food. Everyone is in a hurry, and few believe that they have time to chew their food, let alone sit down and enjoy it.

In the hustle and bustle of today's work-a-day world, highly significant commercial enterprises have been built around fast foods, and the franchise concept is a huge generator of cash.

The hamburger was, and is, the all time leader in the fast food franchise trade for several reasons, not the least of which is its ability to be safely prepared in a very short period of time, and, of course, it is an American staple.

Chicken, also an American favorite, has been widely hailed as an alternative to the hamburger, but it has some draw backs, not the least of which is the length of time required, under ordinary circumstances, to prepare chicken in a quick manner, and cooked sufficiently, so as to make it safe for human consumption.

In order to speed the cooking process, many commercial enterprises have developed and exclusively employ a pressure cooker with an oil cooking medium, into which chicken parts are placed, and which device literally forces hot oil into the meat for rapid penetration and cooking.

Several other commercial enterprises elect, for both aesthetic and flavor reasons, to prepare chicken whole, i.e., the fowl is dressed for cooking, and then cooked, without first sectioning the bird into its well know parts. Preparation typically takes place in a heated environment such as an oven of some sort, with convection ovens currently leading the way due to their even heat and intensity. However, the current state of the art in baking and roasting devices tend to be less efficient and somewhat slower than is desirable if the market potential is to be optimized. It is within this environment that the present invention has been developed.

It will be understood that, for purposes of this specification, the following definitions are intended to apply:

FOWL, shall mean any edible bird;

DRESSED FOWL, shall mean a fowl that has been fully prepared for cooking by the removal of feathers, pin feathers or the like, and the removal of all internal organs;

PREPARATION, shall mean the cooking, of the dressed fowl, whether by roasting, baking, or any other means or manner involving the application of heat, or any combination thereof.

2. Overview of the Prior Art

The concept which underscores the present invention is that of funneling cooking heat to the inside of the fowl, as well as to its outer surface. That fundamental is not new, in and of itself, but as will be developed hereinafter, has been raised to a new, unique, and commercially acceptable level by the present invention.

An early effort, found in the patent art is represented in the Pulver U.S. Pat. No. 1,802,532, which really does not relate to the preparation of fowl at all, but rather the baking of biscuits, with an internal heating element.

The patents to Ryczek, U.S. Pat. No. 5,301,602, and Jovanovic, U.S. Pat. No. number 4,810,856, are representative of the thinking that moisture is important to the preparation of fowl, and both create moisture through the medium of steam applied internally to the bird.

Riesselmann U.S. Pat. No. 4,71 5,273 is yet another variation of the underlying theme. Riesselmann employs a simple heating element in the center of a rotary spit-type device. The heating element is disposed within the cavity of the dressed fowl and throws off heat to cook the bird both internally and externally. As will become apparent from a further reading of this specification, however, the Riesselmann effort is inefficient and ineffective to accomplish the objectives of the present invention.

Several other patented devices exist in the art, among them, Collinucci U.S. Pat. No. 3,980,010, Perez U.S. Pat. No. 2,918,561, Johnson U.S. Pat. No. 3,899,657 and Stepkin U.S. Pat. No. 1,979,501. These patent efforts, far from limiting the scope of the present invention, add emphasis to its novelty and commercial viability.

SUMMARY OF THE PRESENT INVENTION

The present invention embraces both a method of rapidly preparing a fully dressed fowl, such as chicken, and the apparatus for accomplishing that method in the most efficient manner. More specifically, the present invention accomplishes the objectives attributable to it by sealing in juices within the cavity of the fowl being prepared, and thereafter delivering the appropriate heat, evenly distributed throughout the cavity surface. As a consequence, the fowl reaches the appropriate temperature in the thickest places in the fastest time, and the entire cooking process is facilitated. The foregoing is a prime objective of the present invention.

Another objective of the present invention is to delineate a method for preparation of a fully dressed fowl whereby the entire fowl, inside and out, is quickly elevated to the optimum cooking temperature, thereby completing the cooking process in minimal time.

Yet another object of the present invention is to provide both improved apparatus and method for preparing a fowl so as to preserve the maximum natural juices within the meat during the cooking process.

Another, and still further objective of the present invention, is to provide apparatus and method for the preparation of a fully dressed fowl in the shortest possible time consistent with good health and culinary practices by employing higher temperatures without scorching or otherwise damaging the surface of the fowl, making it unappetizing in appearance.

These and other objectives will become more apparent as the detailed specification of a preferred embodiment is read in conjunction with the drawings, wherein:

DESCRIPTION OF A PREFERRED EMBODIMENT

Figure 1:
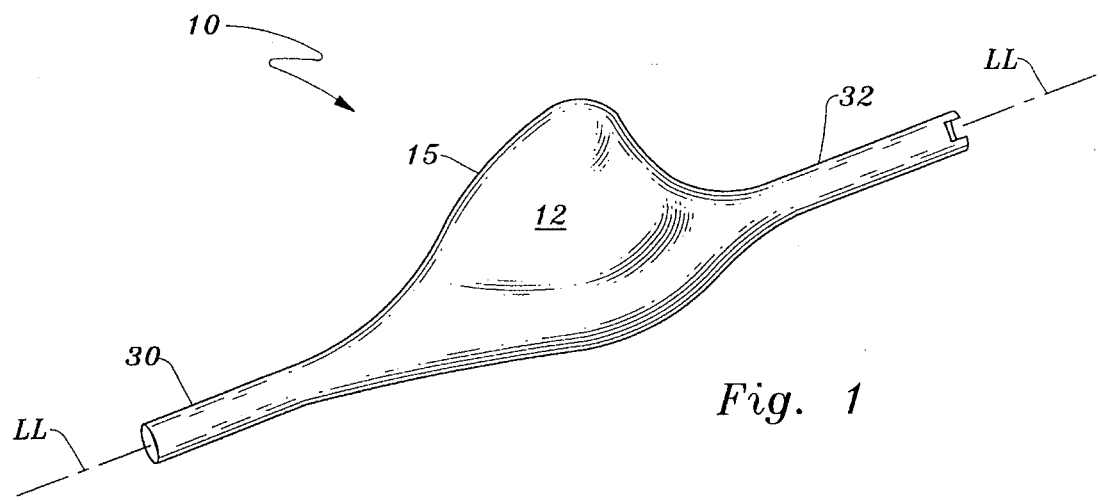
FIG. 1 is a perspective of a preferred embodiment of the cooking apparatus of the present invention.
Figure 2:
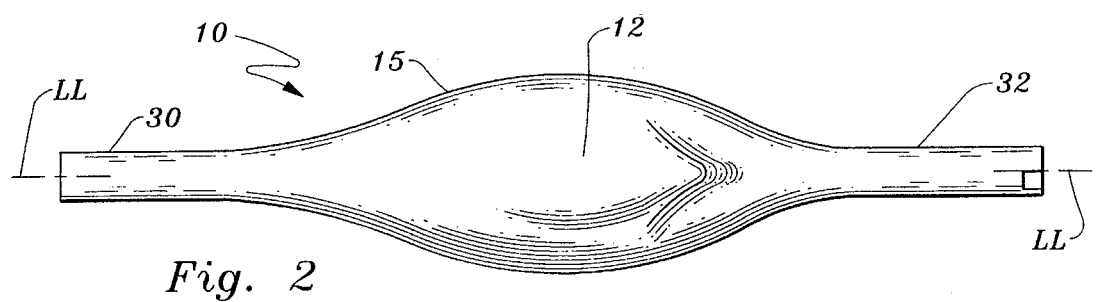
FIG. 2 is a top plan view of the apparatus of the present invention as illustrated in FIG. 1.
Figure 3:
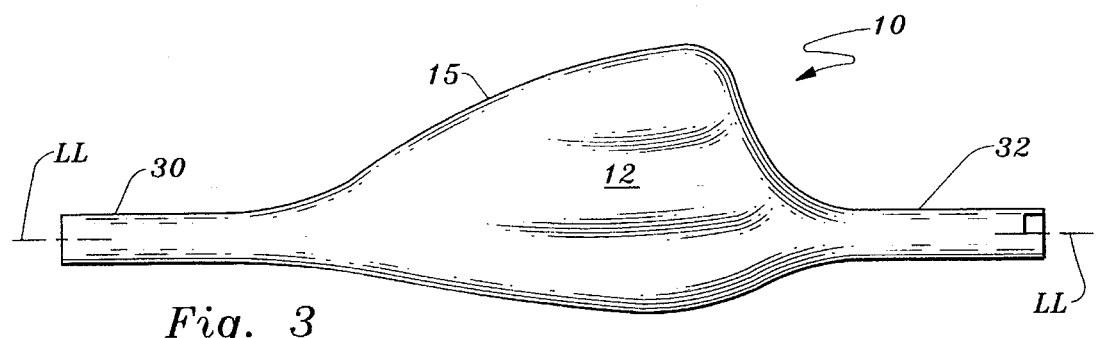
FIG. 3 is a side elevation of the apparatus illustrated in FIG. 1.
Figure 6:
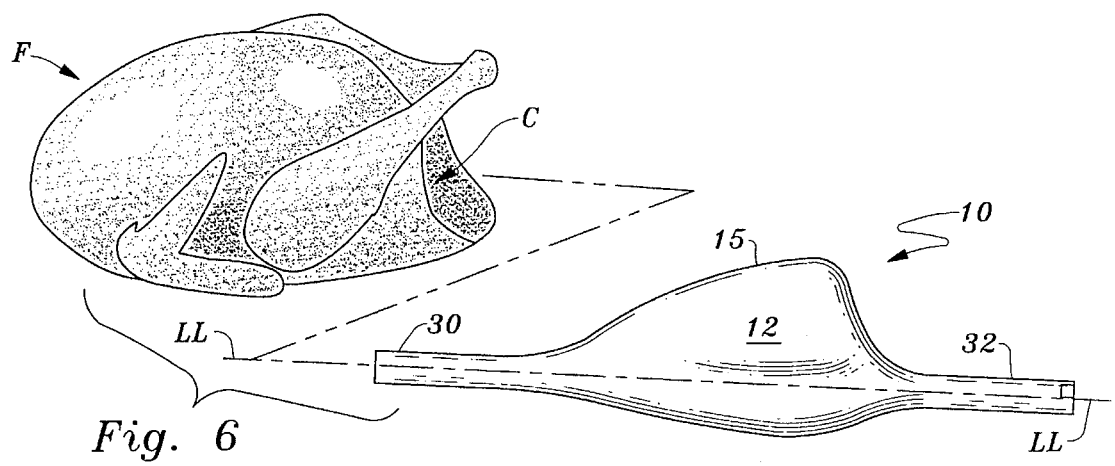
FIG. 6 is a pictorial assembly drawing illustrating the apparatus of FIG. 1 as it would be inserted into the cavity of the fowl.
Figure 7:
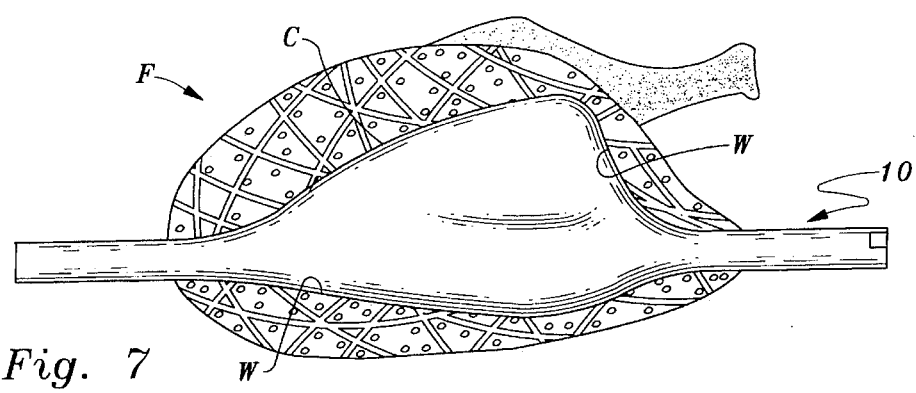
FIG. 7 is a view of the fowl, partially sectioned to illustrate the interrelationship between the apparatus of the present invention and the fowl being prepared by its user; and, FIG. 8 is illustrative of a typical environment in which fowl, employing the apparatus of the present invention, might be placed during the preparation process.

With reference initially to FIGS. 1 and 6, a heat transfer member constructed in accordance with the present invention, 10 is depicted both in perspective and as it would be inserted into a dressed fowl, F, ready for preparation.

The fowl F, here depicted as a whole chicken that has been fully dressed out by the removal of feathers and pin feathers, and having all internal organs removed, defines an internal cavity C, having an internal wall W.

The shape of the cavity C is itself defined by the breast bone, ribs and backbone of the fowl, and that shape, within some limits, is essentially the same in most edible fowl. Obviously, however, the size may vary, and in some cases significantly.

In keeping with the objectives of the invention, the heat transfer member 10 comprises an enlarged, solid bulbous element 12, which has a non geometric peripheral heat transfer surface, that is also asymmetric about a longitudinal axis L-L passing through the center of the heat transfer member. Specifically, the solid bulbous element 12 is shaped to substantially conform to the shape of the cavity C within the dressed fowl.

It is a significant feature of the present invention that, as depicted in FIG. 6, when the heat transfer member is inserted into the cavity C of the fowl F, the entire surface 15 of the element 12 not only conforms to substantially all of the wall W of the cavity C, but actually contacts, and even applies slight pressure to that wall. In this manner, and in accordance with this aspect of the invention, excellent heat transfer characteristics are achieved over the large area of contact between the wall of the cavity and the solid bulbous element 12.

Further in accordance with the invention, and in order to further enhance heat transfer, the heat transfer member 10 is constructed, or otherwise formed of a heat conductive material. It has been found that the use of ceramics provides particularly good heat transfer characteristics, and despite the variations in thickness of the element 12, measured from its longitudinal axis, will provide relatively uniform temperatures at the surface 15, of the heat transfer member when heat is applied to it.

Having thus disclosed the interrelationship of the heat transfer member of the present invention, and a dressed fowl to be prepared, one need only place the heat transfer member in an appropriate heating environment, such as a convection oven it will be understood, however, that a variety of heating environments are available, among them, radiant heaters and conduction heaters.

Figure 8:
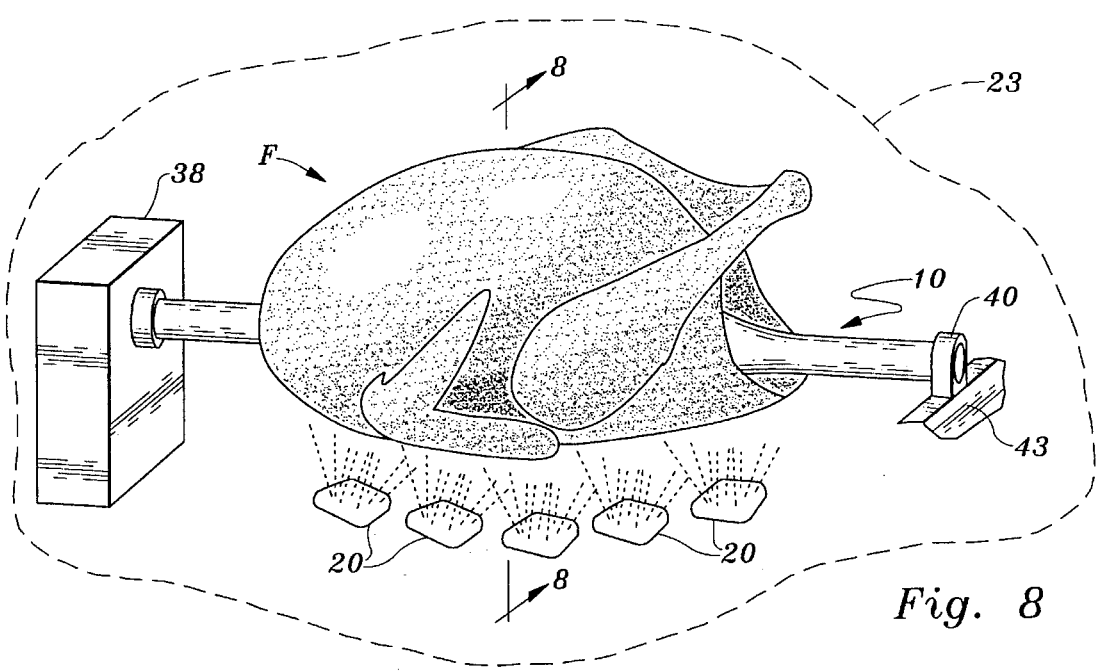

Accordingly, and with reference to FIG. 8, such an environment is illustrated pictorially. A heat source 20 is provided within an enclosure 23 to create a exemplary heating environment. It will be appreciated that the heat source may be partially or totally exposed to the fowl F, or may be concealed within the enclosure. The aforesaid pictorial representation is exemplary only of any one of several cooking environments, ranging from open pit to the most sophisticated of convection ovens.

In order to facilitate the positioning of the fowl F within the cooking environment, represented in FIG. 8 at 23, one embodiment of the heat transfer member 10, of the present invention is provided with forward and rearward extensions 30 and 32, respectively. The extensions 30 and 32 may be integrally formed, or separably formed and attached without departure from the invention, but are preferably made of the same material as the body of the heat transfer member in order to provide consistent heat transfer characteristics.

As seen in FIG. 8, the extensions, or arms, 30 and 32 facilitate the placement of the heat transfer member on a spit 38 for rotation of the fowl F within the cooking environment. Thus, the forward extension is depicted as being connected, in any known manner, to the drive portion of the spit 38, and the rear extension reposes, in the illustrated case, in a pillow block 40, or other holding device which is axially aligned with the drive portion, to thereby permit the heat transfer member 10, and the fowl F mounted thereon in accordance with the present invention, to be rotated at a predetermined speed, thereby enhancing the uniformity with which outside heat is applied. The pillow block, or course, is supported on a rigid support 43 to avoid skewing of the heat transfer member.

While the spit arrangement of the present invention is illustrated as being essentially horizontal, it will be appreciated that the unit may be disposed in a vertical attitude without departure from the invention.

In practicing the invention, the heat transfer member 10 is initially preheated to a predetermined temperature, typically the oven temperature at which the fowl is to be prepared. This can be accomplished in any one of several well understood ways, including, but not limited to placing the heat transfer member in the oven or heating environment. Thereafter, the heat transfer member is inserted into the cavity of the fowl. As a result, an initial searing of the interior wall of the cavity is accomplished. As a consequence, juices from the meat of the fowl F, which would otherwise be forced into the cavity by the application of heat to the exterior surface of the fowl, are sealed in, along with the flavor which those juices represent to the consumer.

Once in the heated environment the fowl is prepared from the inside as well as out. The heat transfer member continues to absorb heat from the environment, and transmit that heat to the interior cavity wall of the fowl, while the exterior surface of the fowl is absorbing heat from the environment in a more conventional fashion. By application of heat both internally and on the exterior, the fowl is, in accordance with the invention, cooked more rapidly, and, indeed, higher temperatures may be used without scorching or burning. By virtue of the uniformity of heat transfer, there are no hot spots, and the preparation process is completed in a shorter period of time. The faster preparation time, in a commercial context, translates into money, in that more fowl may be prepared in a unit of time, with measurably less heat and, thus, less energy is required for the preparation of each fowl.

Figure 4:
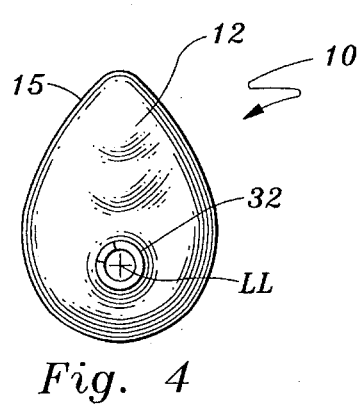
FIG. 4 is a forward elevation of the apparatus of FIG. 1 as it would appear from the forward, or neck, end of the fowl when inserted into place within the fowl.
Figure 5:
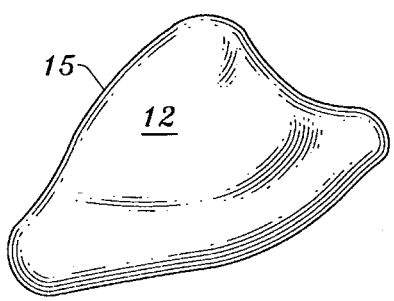
FIG. 5 is a perspective view of a modified form of the apparatus of FIG. 1 wherein the forward and rear extensions are removed.

The present invention contemplates an alternative embodiment, illustrated in FIGS. 4 and 5, in which the extensions 30 and 32 do not exit. The body 12 of the heat transfer member functions identically to that of the FIG. 1 embodiment.

It will now be apparent that the heat transfer member of the present invention has both practical and esthetic uses, in either a home or commercial environment, and that the end product is a more thoroughly prepared, and flavorful, and palatable food stuff.

Having thus described a preferred embodiment of the present invention.

What is claimed is:

1. Heat transfer member for the preparation of fowl which has been dressed out in such a manner as to leave an interior cavity defined by an interior wall, comprising:

a heat transfer member; said heat transfer member having a longitudinal axis; said heat transfer member including a bulbous element formed about said longitudinal axis in asymmetrical fashion such that the bulbous element is formed with an exterior surface defining a shape which substantially conforms to the shape of the interior cavity of the fowl, said exterior surface of said heat transfer member adapted to make heat transfer contact with substantially all of the interior wall of the cavity of the fowl, a heated environment;

means within said heated environment for the controlled application of heat to said heat transfer member so as to cause the heat to be uniformly transmitted to the interior wall of the fowl to thereby initially sear in juices and thereafter continue to apply heat thereto to cook the fowl from the interior, as well as the exterior, thereof.

2. The heat transfer member as set forth in claim 1, wherein said bulbous element is formed of a ceramic heat transfer material.

3. The heat transfer member as set forth in claim 2, wherein said bulbous element is solid.

4. The heat transfer member as set forth in claim 1, wherein means is disposed in said heated environment means and attached to said heat transfer member for rotating the same.

5. The heat transfer member as set forth in claim 1, wherein said bulbous element is provided with an extension along the longitudinal axis of said heat transfer member.

6. The heat transfer member as set forth in claim 1, wherein said bulbous element is provided with a forward extension along the longitudinal axis of said heat transfer member.

7. The heat transfer member as set forth in claim 1, wherein said bulbous element is provided with a rearward extension along the longitudinal axis of said heat transfer member.

8. The heat transfer member as set forth in claim 1, wherein said bulbous member is provided with forward and rearward extensions along the longitudinal axis of said heat transfer member.

9. The heat transfer member as set forth in claim 3, wherein means is disposed in said heated environment means and attached to said heat transfer member for rotating the same.

10. The heat transfer member as set forth in claim 3, wherein said bulbous element is provided with an extension along the longitudinal axis of said heat transfer member.

11. The heat transfer member as set forth in claim 3, wherein said bulbous element is provided with a forward extension along the longitudinal axis of said heat transfer member.

12. The heat transfer member as set forth in claim 3, wherein said bulbous element is provided with a rearward extension along the longitudinal axis of said heat transfer member.

13. The heat transfer member as set forth in claim 3, wherein said bulbous member is provided with forward and rearward extensions along the longitudinal axis of said heat transfer member.

* * * * *